United States Patent [19]

Lundholm

[11] Patent Number: 4,645,212
[45] Date of Patent: Feb. 24, 1987

[54] SEAL ARRANGEMENT

[75] Inventor: Gunnar Lundholm, Lund, Sweden

[73] Assignee: Mechanical Technology Incorporated, Latham, N.Y.

[21] Appl. No.: 811,690

[22] Filed: Dec. 20, 1985

[51] Int. Cl.[4] .................. F16J 15/18; F16J 15/40; F16J 15/56

[52] U.S. Cl. .......................... 277/3; 277/27; 277/68; 277/102; 277/103; 277/125; 277/135

[58] Field of Search ............ 277/3, 27, 102, 103, 277/116.6, 116.4, 116.2, 123, 118, 115, 121, 116.8, 135, 125

[56] References Cited

U.S. PATENT DOCUMENTS

| 432,717 | 7/1890 | Adams et al. | 277/102 |
| 738,043 | 9/1903 | Kinkade | 277/118 |
| 1,482,141 | 1/1924 | Parks | 277/103 |
| 2,049,955 | 8/1936 | Gilbert, Sr. | 277/115 X |
| 2,369,883 | 2/1945 | Coppey | 277/135 X |
| 2,795,195 | 6/1957 | Amblard et al. | 277/135 X |
| 3,602,520 | 8/1971 | Wallis | 277/27 |
| 3,608,912 | 9/1971 | Templin et al. | 277/102 X |
| 4,411,439 | 10/1983 | Couvillion | 277/27 X |

FOREIGN PATENT DOCUMENTS 1161931 9/1958 France ................. 277/102

Primary Examiner—Allan N. Shoap
Attorney, Agent, or Firm—Joseph V. Claeys

[57] ABSTRACT

A seal arrangement is provided for preventing gas leakage along a reciprocating piston rod or other reciprocating member passing through a wall which separates a high pressure gas chmber and a low pressure gas chamber. Liquid lubricant is applied to the lower pressure side of a sealing gland surrounding the piston rod to prevent the escape of gas between the rod and the gland. The sealing gland is radially forced against the piston rod by action of a plurality of axially stacked O-rings influenced by an axially acting spring as well as pressure from the gas.

15 Claims, 2 Drawing Figures

SEAL ARRANGEMENT

The Government of the United States of America has rights in this invention pursuant to Contract DEN3-32 awarded by the United States Department of Energy.

FIELD OF THE INVENTION

This invention relates to a new and improved pumping type seal arrangement for preventing gas leakage along a rectinearly-reciprocating member. Although the present invention has a wide range of applications, it is especially advantageous for use as a piston rod seal for Stirling and other hot gas engines and will be particularly described in that connection.

BACKGROUND OF THE INVENTION

The prior art may best be illustrated by U.S. Pat. Nos. 4,251,081 and 4,448,424. The basic principal of these seal arrangements is that a sealing gland disposed about a reciprocating rod has radial forces maintained on an axial section of the gland and an oil film is drawn between the surfaces of the reciprocating rod and the sealing gland, and a covergent passage provided on the sealing gland effects lubricant pumping. While the foregoing seal arrangements are satisfactory there is a continuing need to provide such pumping type seals which are more reliable, simpler, and less expensive.

SUMMARY OF THE INVENTION

The object of the present invention is to provide a seal arrangement of the type referred to above which retains the desirable pumping and sealing feature of the prior seal arrangements and which may be manufactured at a lower cost primarily due to the fact that certain details could be made with wider tolerance gaps.

Briefly stated, in accordance with one aspect of this invention an improved pumping type seal arrangement is provided for preventing gas leakage along a reciprocating member, such as the piston rod of a hot gas engine, passing through wall means which separates a high pressure gas chamber and a low pressure gas chamber. The seal arrangement comprises a sealing gland, preferably made of a low friction, low elastic modulus material, adapted to surround the reciprocating member. One end of the sealing gland is disposed near the high pressure gas chamber and the other end is disposed near the low pressure gas chamber. The sealing gland has a generally cylindrical outer surface and an inner surface having a slightly increasing diameter in the direction toward the high pressure gas chamber to provide a convergent passage in the direction toward the low pressure gas chamber. A plurality of stacked O-rings are disposed about the other (low pressure) end of the sealing gland and in an annular space between the sealing gland and the wall means, and a bias means is provided to apply an axial force on the stacked O-rings. The seal arrangement also includes means for assuring a film of lubricant oil between the surfaces of the reciprocating member and the sealing gland, and means for limiting the axial movement of the sealing gland.

BRIEF DESCRIPTION OF THE DRAWING

These and other objects, features and advantages of the present invention will become more apparent from the following description taken in conjunction with the accompanying drawing in which.

DETAILED DESCRIPTION OF THE INVENTION

Figures 1, 2:
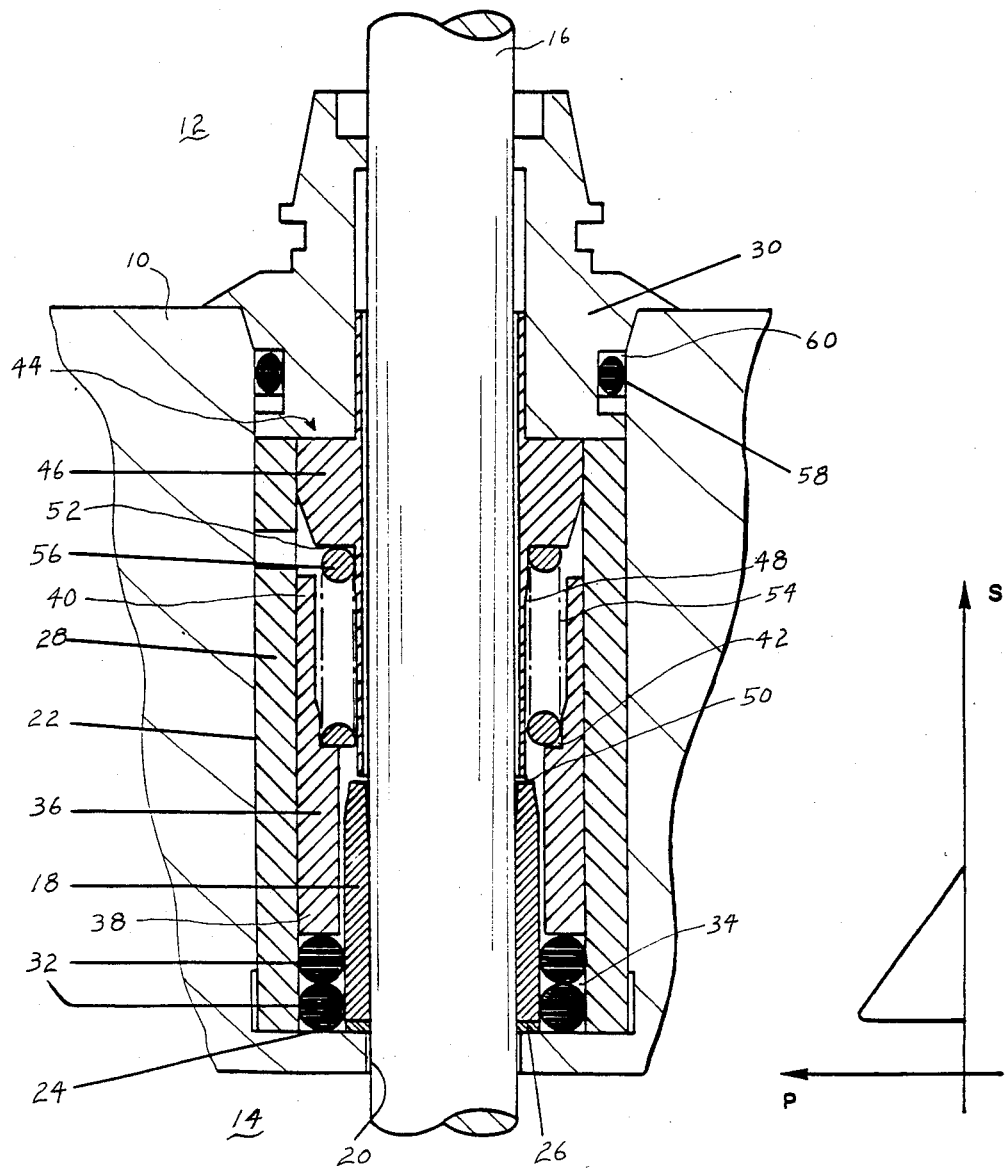
FIG. 1 is a vertical section view through a seal arrangement according to the invention.
FIG. 2 is a diagram showing the pressure of the sealing gland against the reciprocating member along the part of the member contacted by the sealing gland.

As shown in FIG. 1 a wall means 10 separates an upper high gas pressure, oil-free chamber 12 from a lower gas pressure chamber 14, which may be the engine crankcase containing oil and a gas at low pressure. A rod 16 is passed through the wall means 10 and may at its upper end be provided with a piston (not shown) and at its lower end with a cross head (not shown). The seal arrangement may be a part of a pump or an engine not otherwise described.

Rod 16 is surrounded by a sealing gland 18. Preferably, sealing gland 18 is made from a suitable low friction, low elastic modulus material. It may be made, for example, from a suitable plastic, elastomer, soft metal, or other material or composite having low friction and low elastic modulus properties such as polytetrafluoroethylene filled with glass fibers, polytetrafluoroethylene filled with polyimide powder, or polytetrafluoroethylene filled with graphite fibers, silver, cadmium oxide and graphite powder. Sealing gland 18 is of generally cylindrical configuration and has a slightly conical inner surface, the lower end diameter being smaller and the upper end diameter greater than the diameter of the rod 16. For example, if the diameter of the rod 16 is 12.00 mm, the sealing gland 18 may have a length of 20 mm and the two inner surface diameters may be 11.80 mm and 12.20 mm respectively. Thus, there is a convergent passage at the high pressure end of the sealing gland 18 which effects pumping of lubricant drawn into or supplied between the surfaces of the rod and the sealing gland back toward the source.

The wall means 10 is provided with a two-stepped bore the lower part of which is designated at 20 and has a diameter slightly greater than that of the rod 16. The upper part 22 of the stepped bore in the wall means 10 has a substantially greater diameter, thus providing a radial shoulder surface 24 between the two parts of the stepped bore.

A spacer ring 26 having an inner hole diameter greater than the diameter of the bore in the adjacent part of the sealing gland 18 is placed around the rod 16 and rests against the shoulder surface 24. A hollow cylindrical sleeve 28 extends along the greater portion of the upper part 22 of the bore and abuts the surface 24 while being retained by a cover 30 fastened to the wall means 10 by screws or other suitable fastening means (not shown).

A plurality of axially stacked O-rings 32 are disposed around the low pressure end of the sealing gland 18 and in the annular space 34 between the gland 18 and the sleeve 28. A first hollow cylindrical spring support means 36 is disposed within sleeve 28 and about the rod 16. One end 38 of spring support means 36 abuts the stacked O-rings 32 and the other end 40 is provided with an enlarged bore portion which terminates in a shoulder 42. A second hollow cylindrical spring support means 44 has an enlarged portion 46 which fits within and mates with the sleeve 28 and is retained by the cover 30. Spring support means 44 has a smaller diameter portion 48 which extends from the enlarged portion 46. One end of the smaller diameter portion 48 terminates near and defines a small axial gap 50 with the adjacent end of the sealing gland 18. The other end of portion 48 terminates in a shoulder 52 on the enlarged portion 46. The two hollow cylindrical spring support means 36 and 44 are axially and radially overlapping and define a spring retaining space 54. A suitable spring means 56, which may be for example, a pre-stressed, helical compression spring, is disposed within space 54. One end of the spring means 56 abuts the shoulder 42 of the first hollow cylindrical spring support means 36 and the other end of the spring means 56 abuts the shoulder 52 of the second hollow cylindrical spring support means 44. The foregoing described telescoping arrangement of spring support means 36 and 44 provide a means for enclosing and guilding the spring means 56 and provides for application of an axial force on the stacked O-rings.

As shown and described, the extending smaller diameter portion 48 of the second tubular spring support means 44 has such axial length that only a small gap 50 exists between the adjacent end surfaces of the sealing gland 18 and the smaller diameter portion 48 of the spring support means 44. Thus, any axial movement of the sealing gland 18 which might occur for any reason, such as in the event of sticking between the surfaces the rod 16 and the sealing gland 18, will be limited to the amount of the gap 50. This gap can be made sufficiently small to have no influence on the sealing effect of the O-rings 32. For example, the gap in a typical seal arrangement in accordance with this invention may be in the order of 2 mm or less. Moreover, this gap if transferred to the space below the sealing gland 18 will not be sufficient to allow the lowermost O-ring of the stack to be expelled through such gap and affect the sealing. Similarly, any small movement of the rod in radial directions, such as may result from vibrations at an engine cross head, will not affect the operation of the sealing gland 18. Such movements may cause some deformation of the O-rings 32 but such deformation would not affect the sealing ability of the O-rings.

To assure a good seal against gas leakage between the cover 30 and the wall means 10, an O-ring 58 is provided and which fits within a suitable annular groove 60 provided in the cover 30.

The seal arrangement as described and as shown in FIG. 1 will operate as follows, reference also being made to FIG. 2.

The chamber 12 contains a gas at a high pressure (e.g. 20 MPa) while the gas pressure in the chamber 14 might be atmospheric pressure. Gas may leak along the piston rod 16 into the space 54 holding the spring means 56. The gas pressure and the force of the spring means 56 will force the first spring support means 35 downward to compress the stacked O-rings 32. Thus no gas will pass the upper O-ring. However, this force of the spring support means 36 and the pressure of the gas reducing the upper O-ring will compress the stacked O-rings substantially resulting in a force from the stacked O-rings outwardly in all directions. The force from the stacked O-rings upon the sealing gland 18, together with the force on the sealing gland exerted by the gas pressure will result in a pressure in radial directions on the piston rod 16, which pressure is shown in FIG. 2 along the part of the rod 16 contacted by the gland 18.

From FIG. 2 it will be understood that the pressure between the sealing gland 18 and the rod 16 decreases with increasing distance from the bottom end of the sealing gland and of course completely disappears when a gap is formed between the rod 16 and the sealing gland 18 near the upper end of the latter.

If the chamber 14 is the crankcase of an engine it will contain oil because it contains a drive mechanism lubricated by splashing oil. If the chamber 14 does not contain oil a separate oil supply could be provided for adding oil to the part of the rod 16 passing into the chamber 14. That is, lubricant oil is either drawn into or supplied to the surfaces between the rod and the sealing gland.

The oil film formed on the rod 16 will be drawn into the very narrow gap between the sealing gland 18 and the rod 16 and prevent escape of high pressure gas between the rod 16 and sealing gland 18. The wedge shaped gap between the rod 16 and the upper end of the sealing gland 18 will cause any oil reaching such gap to be pumped back against the rising pressure.

It will be understood that small movements of the rod 16 in radial directions due for example, to vibrations and gaps at the cross head (not shown) will not influence the operation of sealing gland 18. Such movements will cause deformations of the stacked O-rings 32, but have no detrimental effect on their sealing capability. Also, if the sealing gland 18 is moved axially on the rod 16 this will have no detrimental sealing effect. The seal of the O-rings allows relative axial movements between the O-rings 32 and the sealing gland 18.

While only a preferred embodiment of the invention has been shown and described in detail herein, it is to be undertstood that the invention is not to be limited thereto and certain changes and modifications will occur to those having ordinary skill in the art. The appended claims, therefore, are intended to cover all such changes and modifications as are encompassed within the true spirit and scope of such claims.

I claim:

1. A seal arrangement for preventing gas leakage along a reciprocating member passing through wall means separating a high pressure gas chamber and a low pressure gas chamber, comprising:
    (a) a sealing gland having a generally cylindrical outer surface positioned within said wall means and surrounding said reciprocating member and wherein one end of the sealing gland is directed toward the high pressure gas chamber and the other end thereof is directed toward the low pressure gas chamber;
    (b) a plurality of axially stacked O-rings positioned around the outer surface of said sealing gland near the said other end thereof and in an annular space between the wall means and said sealing gland;
    (c) bias means for maintaining axial forces on the stacked O-rings;
    (d) means for supplying liquid lubricant to the surface of said reciprocating member; and
    (e) means integral with said sealing gland to effect pumping of liquid lubricant.

2. The seal arrangement recited in claim 1, wherein said bias means includes a compression spring means.

3. The seal arrangement recited in claim 1, wherein said means to effect liquid lubricant pumping includes a convergent passage near at least one end of said sealing gland.

4. The seal arrangement recited in claim 1, wherein said means to effect liquid lubricant pumping comprises forming said sealing gland with a slightly increasing inner diameter in the direction toward the end directed toward the high pressure gas chamber to effect liquid lubricant pumping in the direction back toward the lubricant supply.

5. The seal arrangement recited in claim 1, including means for limiting axial movement of said sealing gland.

6. The seal arrangement recited in claim 1, wherein said bias means comprises a compression spring means prestressed between first and second axially and radially overlapping hollow cylindrical members and wherein a first end of said first hollow cylindrical member abuts the stacked O-rings and a first end of said second hollow cylindrical member is retained by said wall means.

7. The seal arrangement recited in claim 6, including means for limiting axial movement of said sealing gland.

8. The seal arrangement recited in claim 7, wherein said means for limiting axial movement of said sealing gland includes a portion extending from the second end of said second hollow cylindrical member and positioned to form a small gap with the adjacent end surface of the sealing gland.

9. The seal arrangement recited in claim 4, including means for limiting axial movement of said sealing gland.

10. The seal arrangement recited in claim 1, including a spacer ring disposed between the said other end of said sealing gland and said wall means.

11. The seal arrangement recited in claim 10, including means for limiting axial movement of said sealing gland.

12. The seal arrangement recited in claim 11, wherein said means to effect liquid lubricant pumping comprises forming said sealing gland with a slightly increasing inner diameter in the direction toward the high pressure gas chamber.

13. The seal arrangement recited in claim 12, wherein said bias means comprises a compression spring means prestressed between first and second axially and radially overlapping hollow cylindrical members and wherein a first end of said first hollow cylindrical member abuts the stacked O-rings and a first end of said second hollow cylindrical member is retained by said wall means.

14. The seal arrangement recited in claim 13, wherein said means for limiting axial movement of said sealing gland includes a portion extending from the second end of said second hollow cylindrical member and positioned to form a small gap with the adjacent end surface of said sealing gland.

15. The seal arrangement recited in claim 14, wherein said sealing gland is constructed from a low friction, low elastic modulus material.

* * * * *